United States Patent [19]

Rose

[11] 4,146,754

[45] Mar. 27, 1979

[54] TELEPHONE SIGNALLING METHOD AND APPARATUS

[76] Inventor: Sam Rose, 110 Fairlawn Dr., Eggertsville, N.Y. 14226

[21] Appl. No.: 831,604

[22] Filed: Sep. 8, 1977

[51] Int. Cl.² .................................................. H04M 11/00
[52] U.S. Cl. ................................ 179/84 R; 179/2 A
[58] Field of Search .................. 179/2 R, 2 A, 17 E, 179/27 E, 84 R, 84 SS

[56] References Cited

U.S. PATENT DOCUMENTS

| | | | |
|---|---|---|---|
| 3,702,904 | 11/1972 | Bard | 179/84 R |
| 3,783,193 | 1/1974 | Lee | 179/2 A |
| 3,876,836 | 4/1975 | Langan | 179/2 A |

*Primary Examiner*—William C. Cooper
*Assistant Examiner*—Joseph A. Popek
*Attorney, Agent, or Firm*—Kenyon & Kenyon, Reilly, Carr & Chapin

[57] ABSTRACT

The disclosed signalling apparatus provides a different identifying signal in response to a ringing signal for one or more telephone station sets connected by a common line to a centralized switching, control and signalling machine. The different identifying signals are generated in response to the number and timing of ringing signals applied to the line. If a first ring is sensed and within a predetermined first time a second ring is sensed, a first identifying signal is initiated. If a first ring is sensed and after the predetermined first time but before a predetermined second time a second ring is sensed, a second identifying signal is initiated. If a first ring is sensed, but a second ring is not sensed before the predetermined second time, the signalling apparatus is reset to initial conditions. In the disclosed preferred embodiments of the invention, the second identifying signal may be used to provide a signal to a second telephone connected to the common telephone line, or it may be used to control the operation of a remote appliance.

21 Claims, 15 Drawing Figures

TELEPHONE SIGNALLING METHOD AND APPARATUS

BACKGROUND OF THE INVENTION

This invention pertains in general to the field of telephone circuitry. Specifically, the invention relates to logic circuitry and method for generating different output signals applied to a telephone line to which one or more telephone station sets are connected.

There has been an unfilled need for a device by which two or more persons who use a common telephone line can be individually signalled. One such need is where a secretary and an individual who directs or supervises the secretary (hereafter simply referred to as "boss") use the same telephone line on a business PBX or key telephone system. The boss does not wish to answer the telephone, if the caller desires to talk to the secretary. On the other hand, if the call is for the boss, the boss desires to be signalled. Thus, a need exists for a device which can interpret the number and timing of rings, controlled by the calling party, to provide two different identifying signals, one indicating that the boss is being called, the other that the secretary is being called. If the caller, wishing to speak with the secretary, would follow a predetermined sequence of the number and timing of ringing signals, the caller could produce information sufficient to enable suitable apparatus to distinguish such a caller's ringing signals from the ringing signals of all other callers.

Another need exists whereby an ordinary telephone line may be used to signal the control of a remote appliance, e.g. an air conditioner unit in a home, office or factory.

SUMMARY OF THE INVENTION

According to a first embodiment of the invention a logic circuit is provided which is responsive to the number and timing of ringing signals on a telephone line and is used to control the generation of one of two different identifying signals, thereby indicating which one of the two parties for which the call is intended.

The inventive logic circuit is intended for use with one or more telephones in which the usual bell or audio signalling apparatus has been adjusted so as not to generate an audible tone. Nevertheless, the periodic electrical ringing signal sequence, which would otherwise generate the audible tone, remains detectable in the telephone set or sets. A periodic ringing signal sequence comprises a periodic ringing signal for T1 units of time followed by an idle period for T2 units of time. A ringing detector is provided for sensing the electrical ringing signal on the line and for generating ringing pulse signals at the start of each ringing signal on the telephone line.

A counter is provided for counting the number of ringing pulse signals sensed on the line. The counter generates a ring count output signal when the number of ringing signals counted equals a predetermined number of rings, e.g. two rings.

A clock provides a first time measurement signal when T3 units of time have passed from the occurrence of the first of the ring pulse signals and a second time measurement signal when T4 units of time have passed from the occurrence of the first of the ring pulse signals. The unit of time T3 is taken to be greater than the sum of T1 and T2 units of time; T4 is taken to be greater than T3 units of time.

A logic circuit determines whether or not the ring count output signal has occurred (e.g. whether or not two rings have occurred) before the first time measurement signal has occured (e.g., before T3 units of time have occurred from the first ring). If the ring count output signal occurs before the first time measurement signal, a first identifying signal is generated. The first identifying signal is typically an audio signal which is generated by applying a first audio tone enable signal to a first audio signal generator which may or may not be adapted to sound in synchronism with ringing signals on the telephone line.

A second logic circuit determines whether or not the ring count output signal (e.g., two rings) has occurred after the first time measurement signal (e.g., T3 units of time), but before the second time measurement signal (e.g., T4 units of time). If the ring count output signal is present after the first time measurement signal and before the second time measurement signal, a second identifying signal is generated. The second identifying signal is typically a second audio signal which is generated by applying a second audio tone enable signal to a second audio signal generator which may or may not be adapted to sound in synchronism with ringing signals on the telephone line.

The circuit is also provided with means responsive to the first or second audio tone enables signals for resetting the ring counter and the clock to zero conditions when the first and second audio tone enable signals are generated.

A second clock is provided which starts its timing function on the occurrence of the ring count output signal (e.g., two rings). The second clock, reset on the occurrence of each ringing signal, detects the absence of a periodic ringing signal and applies a signal to reset the entire logic circuit. Absence of a periodic ringing signal indicates that the telephone station has been answered or that the calling party has ceased signalling.

According to a second embodiment of the invention the control unit described above is used to control one or more appliances in response to a given coded ringing sequence on the telephone line.

BRIEF DESCRIPTION OF THE DRAWINGS

The invention will be described in conjunction with accompanying drawings in which.

FIGS. 2b through 2e show waveforms in various parts of the ringing detector circuit shown in FIG. 2a;

DESCRIPTION OF THE INVENTION

Figure 1:
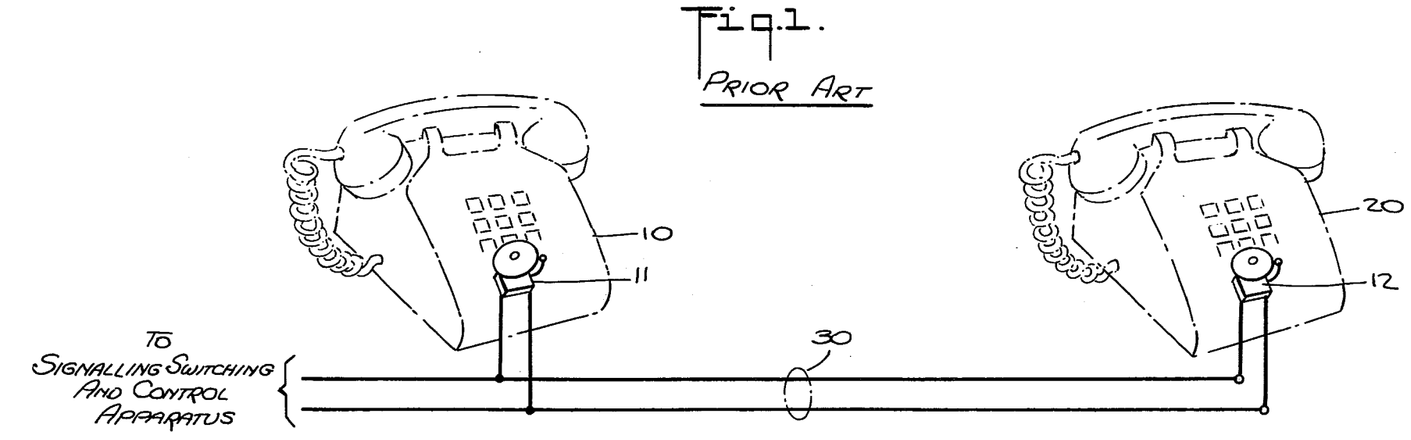
FIG. 1 shows a prior art circuit arrangement in which two telephones are attached to the same line to a switching, signalling and control apparatus.

FIG. 1 illustrates the prior art signalling method whereby one or more telephone station sets are connected to the same line to a central signalling, switching and control apparatus such as a telephone central office, a PBX switching machine or a key service unit in a key telephone system. At least one telephone station 10 has an audio signalling circuit 11 which responds to a periodic ringing signal on line conductor pair 30. One or more other station sets 20 may be typically attached to line 30 and may or may not be equipped for generating an audio signal in response to the periodic ringing signal on line conductor pair 30.

The audio signalling means shown in FIG. 1 are bells 11 and 12, but may also typically be small speakers associated with each telephone. If there are two or more parties using telephone 10 or telephones 10 and 20, there is no way for the parties to determine for whom a call is intended without answering a telephone and determining from the caller the identity of the called party. If a calling party should signal the line with a prearranged calling code, normally both parties using the line would be exposed to rings corresponding to the predetermined calling signal. For example, the following predetermined calling code might be established: continuous ringing if the call is intended for party #1; one ring followed by a period less than thirty seconds after which the telephone station is again signalled if the call is intended for party #2. Where there is merely one station, party #1 would not wish to be disturbed with the first ring signal of the predetermined calling code. Where there are two or more stations, such as telephone station sets 10 and 20 and the sets are sufficiently remote from one another, the audio signal associated with station 10 would not be heard at station 20 and vice versa. In such a case it is desirable that party #1 not be disturbed by hearing an audible signal intended for a call to party #2 and vice versa.

Figure 2:
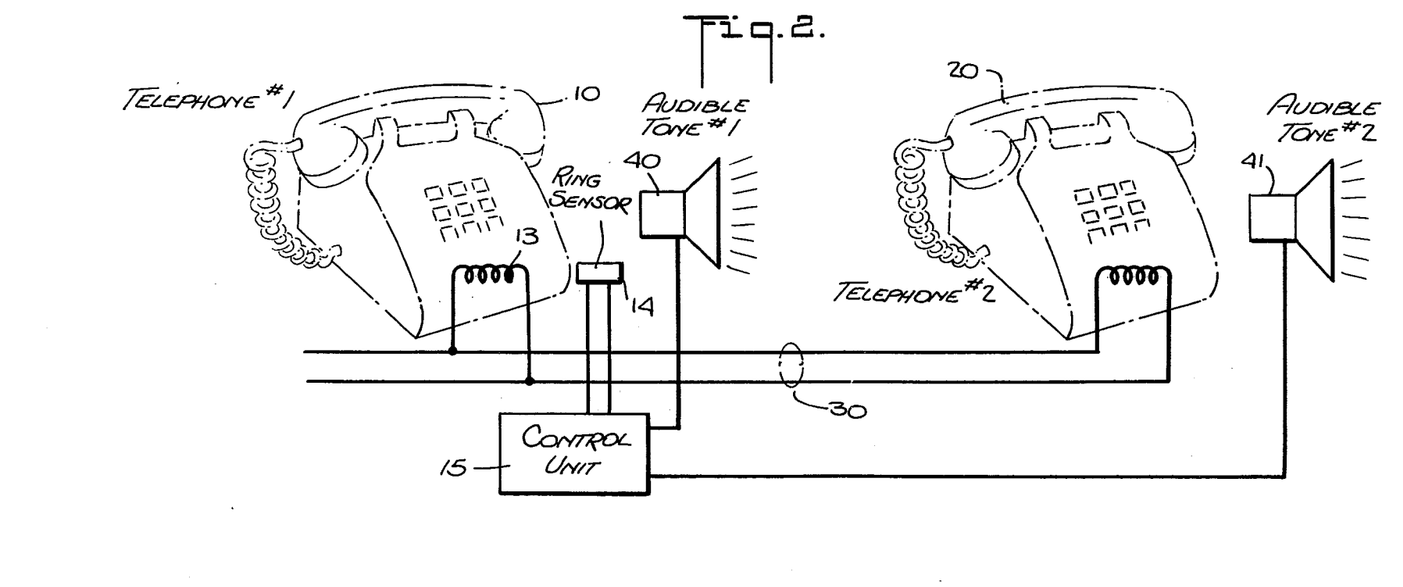
FIG. 2 schematically illustrates how the prior art telephone station sets shown in FIG. 1 may have their original acoustic signalling means (bells, speakers, etc.) disabled and replaced with a control unit constructed in accordance with this invention for producing a first audible tone under certain conditions and a second audible tone under certain other conditions.

FIG. 2 schematically shows how the prior art audio signalling arrangements have been modified in accordance with this invention. The bells 11, 12 (or alternatively, speakers) have been rendered inactive, yet the electrical ringing signal flowing through the bell coil 13, (or speaker transformer) remains in at least one telephone 10. Associated with the bell coil 13 (or speaker transformer) is a ring sensor 14 which senses the electrical ring signal flowing through coil 13. The sensing is preferably made by magnetic induction so that no electrical connection to the telephone line 30 is required. The invention is not limited, however, to the particular means for sensing the ring signal on line conductor path 30. Signals from ring sensor 14 are applied to a control unit 15 which assesses the number and timing of the ring signals to enable either a first audible tone generator 40 or a second audible tone generator 41. The enabling signals may alternatively be used to control other indicating means such as lights, bells, horns, etc.

The preferred embodiment of the invention is for use in conjunction with a predetermined calling code by which a calling party who wants to signal party #2, allows the telephone ringing sequence initially to last for only one ring. After the one ring, the calling party inhibits the ringing by hanging up the receiver (depressing the hookswitch). He then must ring again within a preset time, approximately 30 seconds, in order to enable the apparatus of the invention to commence signalling party #2. All other callers are presumed to belong to a group that simply wishes to call party #1. In the case of such other callers, continuous ring signalling on line 30 enables audio tone generator 40.

For any call on line 30, the audio signal is delayed until after the first ring: when called party #1 is being called, the first audio signal generator 40 is not enabled until the second ring signal is sensed by ring sensor 14; when called party #2 is being called, the second audio tone generator 41 is not enabled until the second ring signal is sensed within the preset delay period after the first ring.

Figure 2A:
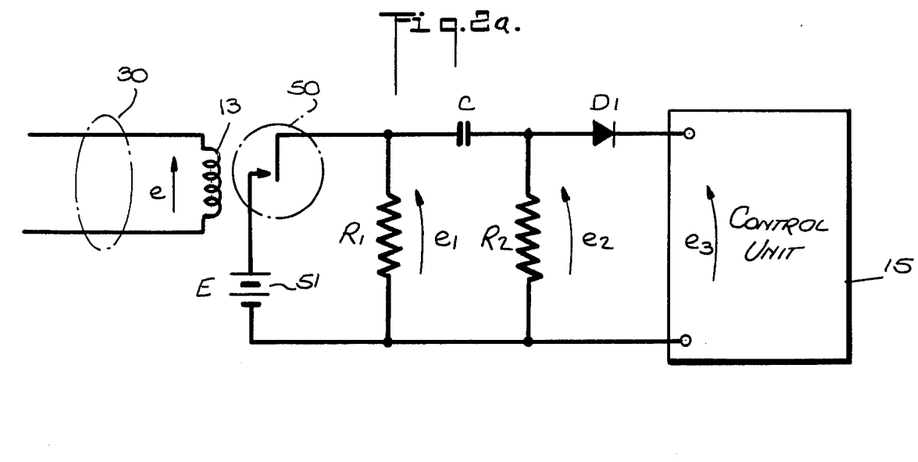
FIG. 2a shows a circuit responsive to periodic ringing signals on the telephone line for generating ringing pulses at the start of each ringing signal.
Figure 2B:
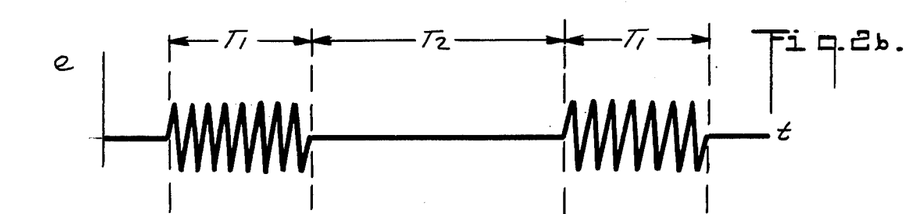
Figure 2C:
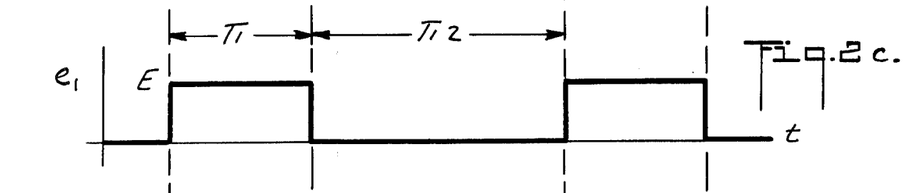
Figure 2D:
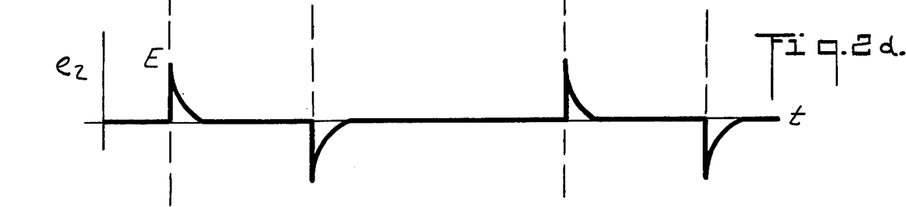
Figure 2E:
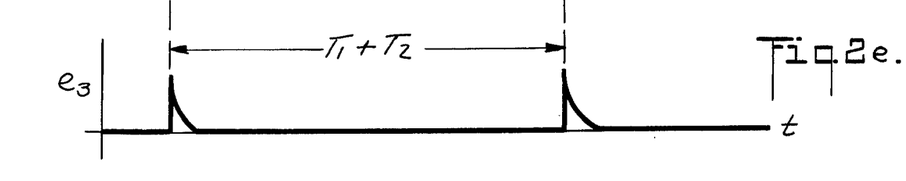

FIG. 2a shows a preferred ring sensor circuit for use with this invention. A reed relay 50 is provided in proximity with telephone coil 13. The relay's contacts close when an alternating current voltage appears across coil 13. FIG. 2b illustrates the ringing sequence of the voltage E appearing across coil 13. Alternating voltage occurs for the ringing period T1 followed by an idle period T2. The total period of ringing sequence is the sum of the ringing period and the idle period, T1+T2. When the contacts of reed relay 50 close, the voltage $e_1$ appearing across resistor R1 rises to E volts, the value of d.c. source 51. When reed relay 50 contacts open, voltage $e_1$ falls to zero volts. The voltage $e_2$ across resistor R2 initially rises to E volts but exponentially decays to zero as the voltage E rises on charging capacitor C. When the ringing signal stops, and the idle period begins, a negative pulse $e_2$ appears across resistor R2 as shown in FIG. 2d. Diode D1 allows only positive pulses $e_3$ to appear across the output terminals of the ring sensor to be applied to control unit 15. The pulses $e_3$, are illustrated in FIG. 2e and occur at the start of each ringing signal.

Figure 3A:
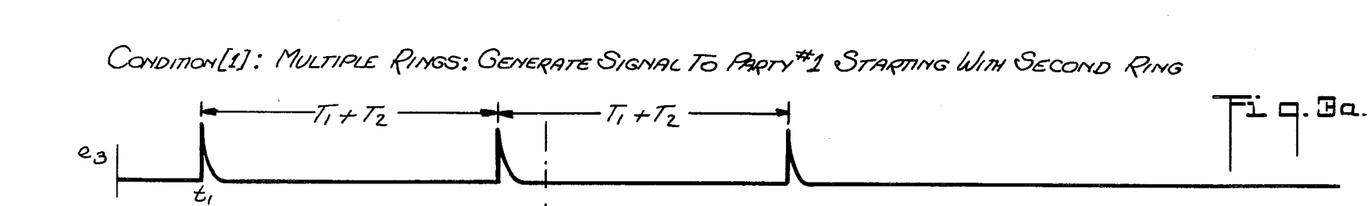
FIGS. 3a-3c are illustrative diagrams showing the waveform of FIG. 2 for different ringing conditions and setting out the rules by which the logic circuit operates to enable first or second audio tone generators or resets itself to initial conditions.
Figures 3B, 3C, 6:
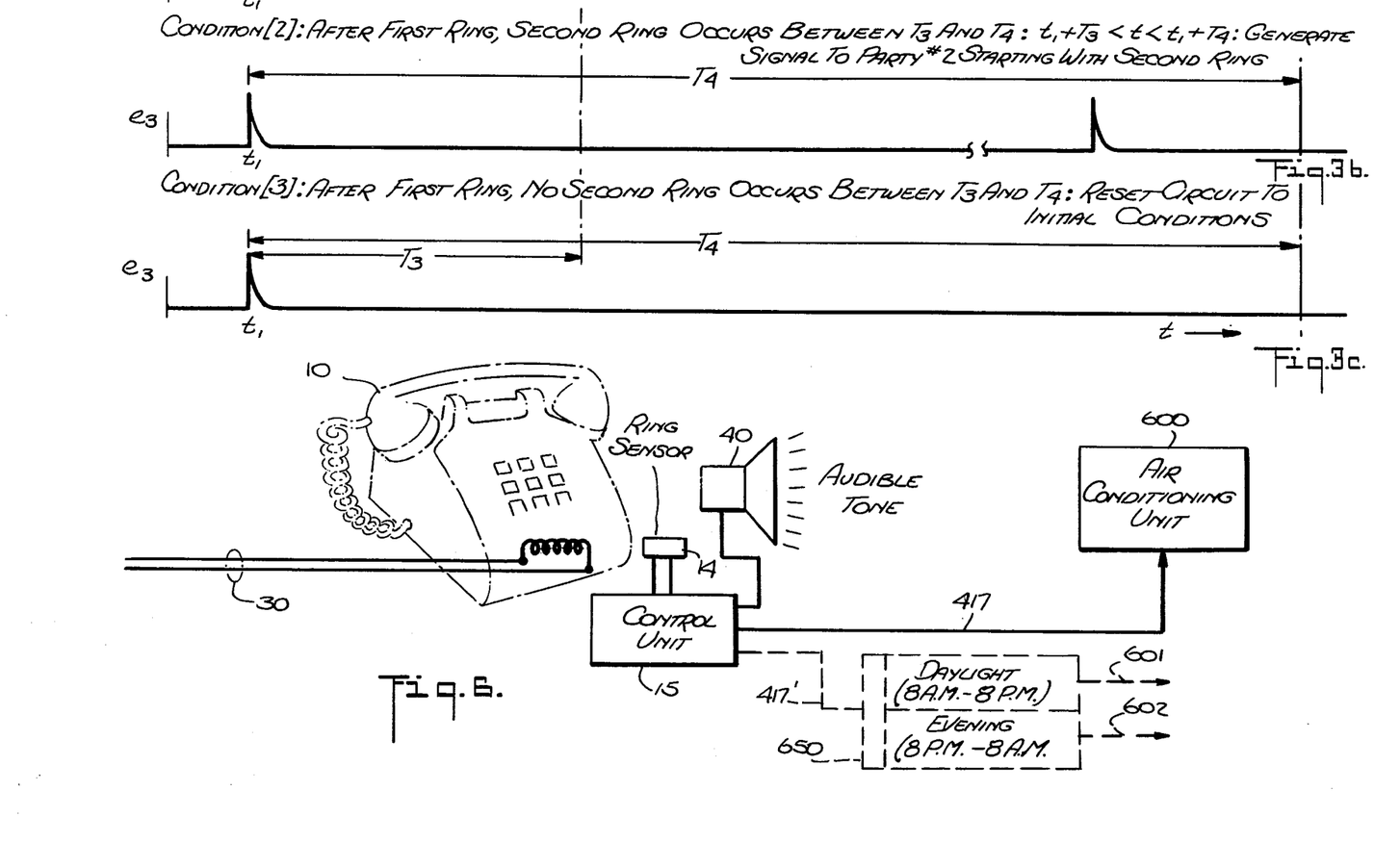
FIG. 6 illustrates a circuit arrangement in which telephone #2 of FIG. 2 is replaced by an appliance and which is activated by means of telephone commands.

FIG. 3 illustrates the logic by which the control unit is designed in order to distinguish the called party on the basis of the number and timing of incoming ring signals.

FIG. 3a shows that if two ring pulses are sensed before a predetermined time T3, selected to be greater than the one ringing sequence time period (T1+T2) but less than two ringing sequence time periods, then a first audio generator will be enabled starting with the second ring pulse.

FIG. 3b shows that if a first ring pulse is sensed, at time $t_1$, and a second ring pulse only occurs between $t_1+T3$ and $t_1+T4$, then a second audio generator will be enabled, starting with the second ring pulse.

FIG. 3c illustrates the condition where a first pulse is sensed at time $t_1$ and no second pulse is received before $t_1+T4$. When this condition occurs, the control circuitry must be reset to initial conditions.

Figures 4, 7:
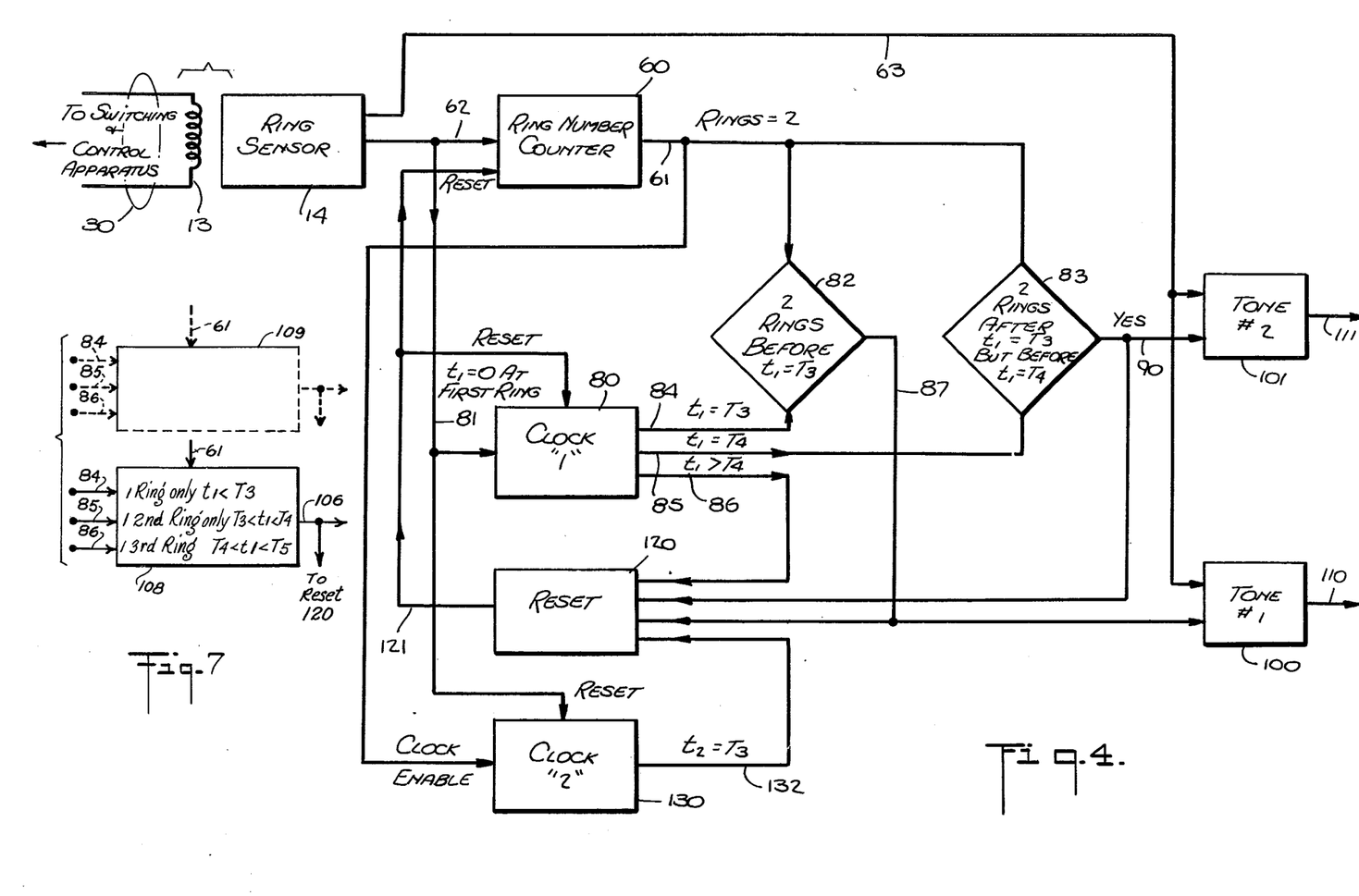
FIG. 4 is a functional flow chart for logic circuitry according to the invention.
FIG. 7 is a functional flow chart for logic circuitry to be connected to the flow chart of FIG. 4 to provide for control of an additional appliance.

FIG. 4 illustrates in block diagram form the hardware necessary to carry out the logic functions illustrated in FIG. 3. Ring sensor 14 generates one pulse on lead 62 at the start of each ringing signal of the ringing sequence appearing at coil 13. Ring number counter 60, responding to the pulses on lead 62, produces a ring count output on lead 61 when two ring pulses have been received. Clock "1" (80) is enabled with the first ring pulse on lead 81 from ring sensor 14. Clock "1" (80) produces outputs on leads 84, 85 and 86 if time has reached T3, T4 or greater than T4 units of time.

Comparator logic circuit 82 compares the ring count output on lead 61 with the first time measurement output signal on lead 84 to determine if, for example, two rings have occurred before time has reached T3 units of time after the first ring. If comparator logic circuit 82 determines that two rings have occurred before T3 units of time, then an output signal on lead 87 is applied to a tone #1 generator 100 (or other suitable identifying device) to enable it.

As shown in FIG. 4, tone #1 generator 100 also has an input from ring sensor 14 via lead 63. Applying the signal from an output of ring sensor 14 to tone #1 generator 100 indicates that a first audible tone on output lead 110 will be in synchronism with the ringing signals of the ringing sequence applied to the telephone station from the central signalling, switching and control apparatus. It should be realized that tone generator #1 signal 110 need not necessarily be in synchronism with the ringing sequence from the central signalling switching and control apparatus but rather, may operate independently.

Comparator logic circuit 83 determines if two rings have been received, as indicated by the output on lead 61, before time has reached T4 units of time as indicated by an output on lead 85. If so, an output signal on lead 90 enables tone #2 generator 101 for producing an audio signal on lead 111, thereby indicating that party #2 is being called.

Output signals from comparator 82 on lead 87 and output signals from comparator 83 on lead 90 are each applied to a reset logic circuit 120 which in turn resets clock "1" (80) and ring number counter 60 via lead 121. If clock "1" (80) generates an output on lead 86, indicating that greater than T4 units of time have passed since the first ring pulse on lead 62, the signal on lead 86 is applied to reset logic circuit 120 for resetting clock "1" 80 and ring number counter 60.

The clock "2" circuit 130 is provided for resetting the logic circuitry of the invention after tone #1 signal on lead 110 is established or after tone #2 signal on lead 111 is established, but either the telephone station has been answered or the calling party has stopped signalling. Clock "2" (130) is enabled from lead 61 from ring number counter 60 indicating that two rings have been received. The clock "2" (130) is reset from ring pulse signals on lead 81 via lead 62 occurring with every ring pulse. An output on lead 132 from clock "2" (130) will only appear if T3 units of time have passed before clock "2" (130) is again reset by a ring pulse on lead 62. Thus, an output on lead 132 indicates that too great a time has elapsed since the last ring signal was received. The signal on lead 132 is applied to logic reset circuitry 120 for resetting all logic circuitry in the circuit arrangement.

Figures 5, 5A:
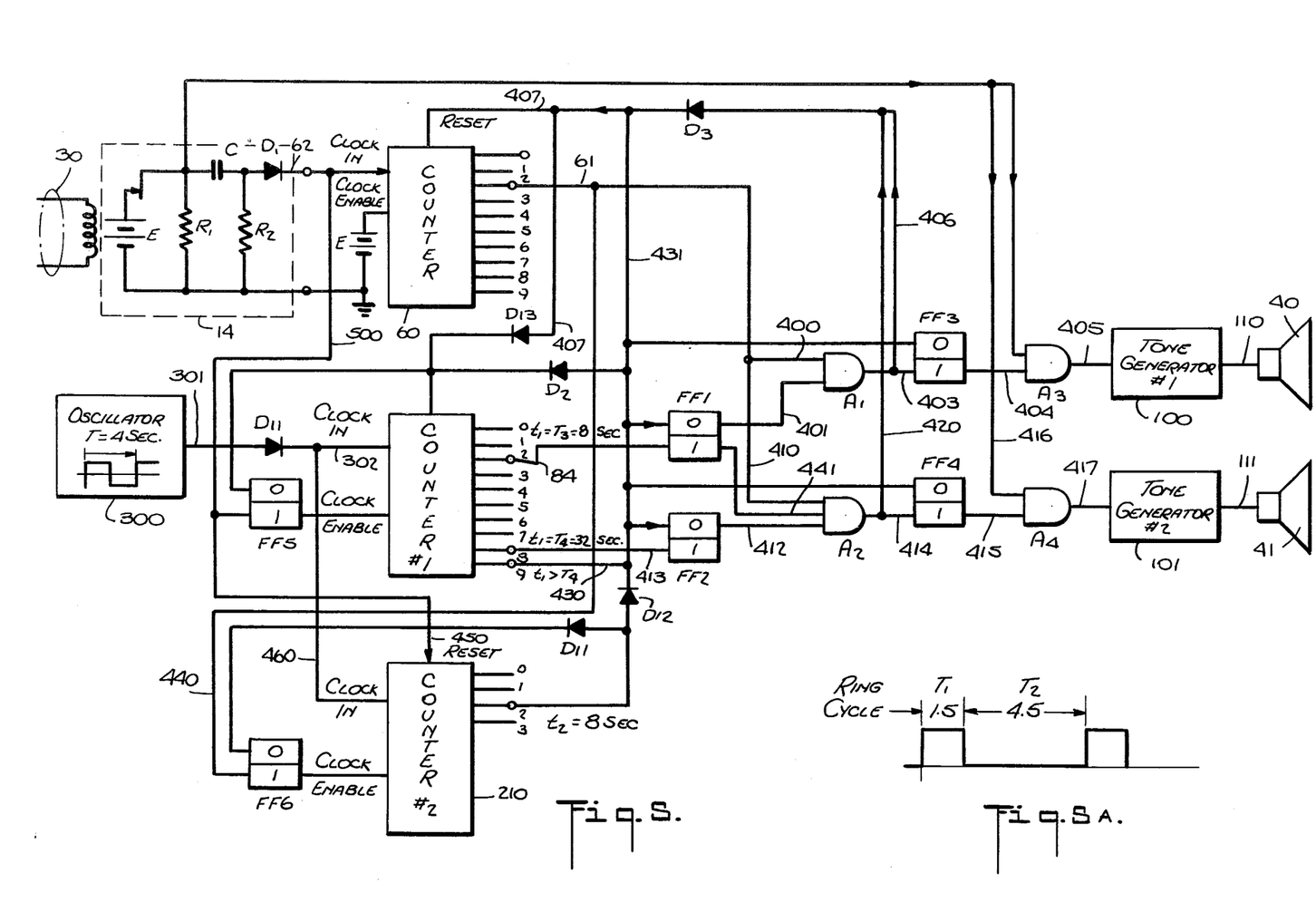
FIG. 5 shows the preferred embodiment of logic circuitry constructed in accordance with the invention.
FIG. 5a is a waveform diagram showing the ring signal sequence of FIG. 5 with respect to time.

FIG. 5 shows a detailed schematic drawing of a preferred embodiment which is used to accomplish the functional features outlined in FIG. 4. Ring sensor circuit 14 applies ring pulse signals on lead 62 which are applied to counter 60 via a "clock in" lead 63. Counter 60 is a decade counter enabled via a clock enable lead 64 by a d.c. voltage E. Decade counter 60 has ten output leads, each having a voltage placed in sequence thereon as determined by the number of pulses on lead 63 received by it. Output lead 61 from output 2 will be enabled once the counter 60 has received two ring pulse signals via a "clock in" lead 63.

Counter #1 (200), in conjunction with oscillator 300, serves to measure time in this embodiment of the invention. If the ring sequence cycle is as it is shown, for example, in FIG. 5A where the ringing signal T1 is 1.5 seconds and the idle period of the ringing sequence T2 is 4.5 seconds, then a preferred period T for oscillator 300 is approximately 4 seconds, as shown in FIG. 5. The output from oscillator 300 on lead 301 is applied via diode D11 to the "clock in" lead 302 to decade counter #1 (200). The decade outputs of counter 1 represent integral multiples of period T of oscillator 300. A decade output 1 from counter #1 (200) represents 4 seconds, decade output 2 represents 8 seconds, etc. Lead 84 on decade counter #1 (200), when enabled, indicates that approximately 8 seconds have occurred from the time counter #1 (200) was initially enabled from the output of flip-flop 5 (FF5), which is set to a "one" output on the occurrence of the first ring sensor output pulses of lead 62. An output signal on decade output 8 of counter #1 (200) indicates that approximately 32 seconds have occurred from the first ring pulse signal. An output on decade lead 9 of counter #1 (200) indicates that a time period greater than 32 seconds has passed from the occurrence of the first ring pulse.

The output from counter 60 on lead 61 is applied to one input lead 400 of AND gate A1. The "zero" output of lead 401 from flip-flop 1 (FF1) is applied to a second input lead of AND gate A1. An output from lead 401 is present on flip-flop (FF1) when all of the circuitry is set to zero or initial conditions and before an input to the one input of flip-flop 1 (FF1) has been received. An output is received on lead 403 OF AND gate A1, if, and only if, two ring pulses have been received by counter 60 before counter 200 produces an output on lead 84, indicating that 8 seconds of time (T3) have passed since receiving the first ring pulse. If an output is produced at the output of AND gate A1 on lead 403, flip-flop 3 (FF3) has its "one" input pulsed, thereby producing an output from the "one" output lead 404 of flip-flop 3 (ff3). An output on lead 404 is applied to one input lead of AND gate A3. The other input lead of AND gate A3, lead 404, applies ring synchronism voltages from ring sensor 14 via resistor R1, which has a d.c. voltage E placed thereon during the ringing signal applied on telephone line 30. The output of AND gate A3 on lead 405 is applied to tone generator #1 (100) (or any other indicating means such as lights, bells, horns, etc.) which produces a first output signal on lead 110 for producing a first audio output signal. If two ring pulses have been received before T3 units of time have passed, an output signal on lead 403 on the output of AND gate A1 is also applied on lead 406 to reset counter 60 and counter 200.

If counter 600 does not count two ring pulse signals before T3 units of time have passed, flip-flop 1 (FF1) will have its "one" input cell enabled via lead 84 when T3 units of time have passed, thereby disenabling an output on lead 401 and preventing the enablement of tone generator #1 (100). However, if counter 60 registers two ring pulse counts by producing an output on lead 61 before T4 units of time have passed (32 seconds), then all of the input leads of AND gate A2 have inputs: lead 410 has an input when lead 61 is energized, lead 411 has an input because the "1" output of flip-flop 1 (FF1) is high, because more than T3 units of time have passed, and lead 412 from the "zero" cell of flip-flop 3 (FF3) is high, because the input to the "one" cell from lead 413 has not yet been produced. Thus, on the condition that two rings have been counted after T3 units of time have passed, but before T4 units of time have passed, an output from AND gate A2 on lead 414 is present, which is then applied to the "one" cell of flip-flop 4 (FF4). The output of the "one" cell on lead 415 is applied to the one lead of AND gate A4. The other input lead of AND gate A4 via lead 416 connected to lead 404 then produces an output from AND gate A4 from lead 417 in synchronism with the ring signals applied from the signalling, switching and control apparatus, thereby enabling tone generator #2 (101) (or any other indicating means) for producing audible tones on lead 111. The output of AND gate A2 via lead 420 is applied to reset the counter 60 and counter 200.

If the time length after the first ring pulse is greater than T4 units of time, and two rings have not been sensed on lead 61, then a decade output 9 on counter 200 produces an output on lead 430, which is applied to bus 431 for resetting all of the logic circuitry of the invention. A reset signal on bus 431 is applied to the zero inputs of flip-flops FF1, FF2, FF3, FF4 and is also applied to reset counter 60 and counter #1 (200) and to the "zero" input or flip-flop 5 (FF5), which is used to enable counter (200).

If counter 60 counts two ring pulses before it has been reset, then as indicated above, either tone generator #1 (100) or tone generator #2 (101) is enabled. On this condition flip-flop 6 (FF6) is enabled via lead 440 connected to lead 61 so as to enable counter #2 (210). Counter #2 (210) is reset via lead 450 with each ring pulse from lead 62 via lead 500. Counter 210 has its "clock in" input lead 460 pulsed by oscillator pulses on lead 301 from oscillator 300. Thus, counter #2 (210) incrementally counts the units of time from the last ring pulse on lead 62, because it is reset with each ring pulse of lead 450. Decade lead 2 at the output of counter #2 (210) will be energized only when 8 seconds have passed since the beginning of the last ring signal. The output from decade lead 2 of counter 210 is applied to bus 431 for resetting all of the logic circuitry of the circuit arrangement.

Diodes D11 and D12 insure that the zero input of flip-flop 6 (FF6) is only enabled by an output from decade lead 2 of counter 210. Diodes D2 and D3 insure that only counter #1 (200) and counter 60 are reset on the occurrence of outputs from AND gates A1 or A2. Thus, it is seen that counter #2 (210) applies an output of decade lead 2 for application to bus 413 for resetting the entire circuit when greater than 8 seconds have passed from the beginning of the last ring pulse, a condition indicating that either the called party has picked up his telephone set or the calling party has ceased ringing.

Another feature of this invention relates to its use for remote control of home, office or factory appliances. For example, there can be the desire to activate or control equipment in a remote location by means of telephone commands. As illustrated in FIG. 6, rather than connecting two telephones to the same line, equipment such as an air conditioning unit 600 may be substituted for the telephone #2 (20) as illustrated previously in FIG. 2. The embodiment of the invention illustrated by FIG. 6 could be identical in all respects to that described previously with the exception that coded dialing would produce a start signal to air conditioning unit 600 rather than initiating an enable signal to the tone generator associated with a telephone. The control unit 15 could be identical to that illustrated in FIG. 5 with the exception that line 417 would be connected to a start switch of air conditioning unit.

The embodiment illustrated in FIG. 6 (with the control unit 15 being constructed as illustrated in FIG. 5) would allow signalling of telephone calls to telephone 10 to be made, the ringing or tone signalling beginning with the second ringing sequence. On the other hand, if the ringing signal or telephone line 30 were only one ring signal within T3 units of time, followed by at least one other ring signal between T3 units of time and T4 units of time, the air conditioning unit would be enabled. The use of an air conditioning unit in this description of an alternative embodiment of the invention is only by way of one example. Other examples of systems which could be remotely controlled in the manner illustrated are burglar alarm systems, electric lights, garage doors, ovens, furnaces, etc.

It is possible, of course, to construct control unit 15 so that it may respond to two, three or even more codes of the nature described above, in order that two or more appliances can be remotely controlled via a telephone line. The codes would be combinations of numbers of rings occurring within predetermined timing sequences. For example, where two appliances must be controlled, a first appliance could be controlled according to a code described above with the added condition that only one ring be detected between T3 and T4.

A second appliance could be controlled according to a second code as follows:
 one ring only between the start of the first ring and a time T3 from the start of the first ring, T3 being selected to be greater than T1 plus T2 where T1 is the length of the ring signal and T2 is the length of the idle period of the ringing sequence,
 one second ring only between time T3 and T4, and at least one ring signal between T4 and T5 where T4 would be selected to be approximately equal to twice the length of time T3, and T5 would be selected to be a sufficient time length greater than T4 to allow the user to initiate the third ring signal. The control unit would be constructed to generate a first appliance enable signal for the first appliance in response to the first coded signal, a second appliance enable signal for the second appliance in response to the second coded signal, and a tone enable signal for the telephone signal in response to a continuous ring signal. Thus, as shown in FIG. 4, the first appliance enable signal is on lead 90 from logic circuit 83 and is fed to a first appliance to, for example, start or stop it. The second appliance enable signal is generated by the logic circuit 108 shown in FIG. 7. Logic circuit 108 is responsive to the ring count output signal on line 61 and to the first, second and third time measurement signals on lines 84, 85 and 86, respectively, of FIG. 4 for generating the second appliance enable signal (a third identifying signal) on line 106 when the first ring count output signal occurs after the first time measurement signal but before the second time measurement signal occurs, and the second ring output signal occurs after the second time measurement signal but before the third time measurement signal occurs. The second appliance enable signal is fed to the second appliance on line 106, for example, start or stop it. Additional appliances could be controlled by other codes using additional logic circuits 109. The second appliance enable signal and enable signals from additional appliances are fed to Reset 120 of FIG. 4 to provide for resetting of the logic circuitry.

Another embodiment of this invention relates to the addition to the control unit of FIG. 6 of a clock by which two or more signals may be generated depending on the time of day. The clock 650 shown in dashed lines at the bottom of FIG. 6 when initiated by an output signal 417 from control unit 15 as a result of a coded ringing sequence applied to telephone line 30 produces an output on lead 601 during the "daylight" hours of the day and an output on lead 602 during the evening hours of the day. Appliances such as an air conditioner or an oven might be connected to the daylight enable lead 601 while house lights or a burglar alarm might be connected to the evening enable lead 602.

It is to be understood that the invention is not limited to the exact details of construction, operation, or identical embodiments shown and described, because obvious modifications and equivalents will be apparent to one skilled in the art. The invention is therefore limited only by the scope of the claims which follow.

What is claimed is:

1. Apparatus for generating two identifying signals depending on the number and timing of the ringing signals of a telephone station set circuit arrangement in which at least one telephone station set is connected by a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the apparatus comprising:

means responsive to the ringing signal on the line for generating a ring pulse signal for each occurrence of a ringing signal;

means responsive to the ring pulse signals for generating a ring count output signal when a number N of ring pulse signals have been received;

clock means responsive to the first of the ring pulse signals for generating a first time measurement signal when T3 units of time have passed from the occurrence of the first of the ring pulse signals and for generating a second time measurement signal when T4 units of time have passed from the occurrence of the first of the ring pulse signals, said T3 units of time being greater than the sum of T1 and T2 units of time, said T4 units of time being greater than T3 units of time;

first circuit means responsive to said ring count output signal and to said first time measurement signal for generating a first identifying signal when said ring count output signal occurs before said first time measurement signal occurs;

second circuit means responsive to said ring count output signal and to said second time measurement signal for generating a second identifying signal when said ring count output signal occurs after said first time measurement signal is generated but before said second time measurement signal is generated;

first identifying means responsive to said first identifying signal for generating a first identification to indicate that N rings have occurred before T3 units of time have passed from the start of the first ring; and second identifying means responsive to said second identifying signal for generating a second identification to indicate that a total of N rings have been counted at a time after T3 units of time but before T4 units of time have passed from the start of the first ring.

2. The signalling apparatus of claim 1 further comprising resetting means responsive to said first identifying signal and to said second identifying signal for resetting said ring count output signal and said clock means to zero conditions if N rings have occurred before T3 units of time have passed from the start of the first ring, or if N rings have occurred after T3 units of time have passed from the start of the first ring but before T4 units of time have passed.

3. The signalling apparatus of claim 2 wherein said clock means generates a third time measurement signal if said clock means has not been reset by said resetting means when more than T4 units of time have passed from the occurrence of the first of the ring pulse signals, and wherein said third time measurement signal is applied to said resetting means for resetting said ring counting means and said clock means to zero conditions when more than T4 units of time have occurred from said first ring signal, but less than N ring signals have occurred.

4. The signalling apparatus of claim 3 further comprising:

second clock means, enabled by said ring count output signal when N ring pulse signals have been received, and reset by each first pulse signal, for generating a second clock output signal after T3 units of time have occurred after said second clock means has been reset while enabled;

said second clock output signal being applied to said resetting means for resetting said ring counting means and said clock means to zero conditions, whereby said signalling apparatus is reset to initial conditions when the ringing signal on the line is terminated.

5. The signalling apparatus of claim 1 wherein N is set to be the number two.

6. The signalling apparatus of claim 1 wherein T3 is set to approximately eighty seconds, and T4 is set to approximately thirty-two seconds.

7. The signalling apparatus of claim 1 wherein:

said first identifying signal is a first audio tone enable signal;

said second identifying signal is a second audio tone enable signal;

said first identifying means is a first audio tone generator and speaker; and said second identifying means is a second audio tone generator and speaker.

8. Apparatus for generating two distinct signals depending on the number and timing of the ringing signals of a telephone station set circuit arrangement in which at least one telephone station set is connected to a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the apparatus comprising;
   means responsive to the ringing signal on the line for generating a ring pulse signal for each occurrence of a ringing signal;
   means responsive to the ring pulse signals for generating a ring count output signal when a number N of ring pulse signals have been received;
   clock means responsive to the first of the ring pulse signals for generating a first time measurement signal when T3 units of time have passed from the occurrence of the first of the ring pulse signals and for generating a second time measurement signal when T4 units of time have passed from the occurrence of the first of the ring pulse signals, said T3 units of time being greater than the sum of T1 and T2 units of time, said T4 units of time being greater than T3 units of time;
   first circuit means, responsive to said ring count output signal and to said first time measurement signal, for generating a first identifying signal when said ring count output signal occurs before said first time measurement signal occurs;
   second circuit means, responsive to said ring count output signal and to said second time measurement signal, for generating a second identifying signal when said ring count output signal occurs after said first time measurement signal is generated, but before said second time measurement signal is generated;
   first identifying means responsive to said first identifying signal for generating a first identification thereby indicating that N rings have occurred before T3 units of time have passed from the start of the first ring; and
   appliance control means responsive to said second identifying signal for controlling an appliance.

9. Apparatus for generating three distinct signals depending on the number and timing of the ringing signals of a telephone station set circuit arrangement in which at least one telephone station set is connected to a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the apparatus comprising:
   means responsive to the ringing signal on the line for generating a ring pulse signal for each occurrence of a ringing signal;
   means responsive to the ring pulse signals for generating a first ring count output signal when a predetermined number N of ring pulse signals have been received and for generating a second ring count output signal when greater than N ring pulse signals have been received;
   clock means responsive to the first of the ring pulse signals for generating a first time measurement signal when T3 units of time have passed from the occurrence of the first of the ring pulse signals, for generating a second time measurement signal when T4 units of time have passed from the occurrence of the first of the ring pulse signals, and for generating a third time measurement signal when T5 units of time have passed from the occurrence of the first of the ring pulse signals, said T3 units of time being greater than the sum of T1 and T2 units of time, said T4 units of time being greater than T3 units of time, said T5 units of time being greater than T4 units of time;
   first logic circuit means, responsive to said ring count output signal and to said first time measurement signal, for generating a first identifying signal when said first ring count output signal occurs before said first time measurement signal occurs;
   second logic circuit means, responsive to said ring count output signal and to said first, second and third time measurement signals for generating a second identifying signal when said first ring count output signal occurs after said first time measurement signal but before said second time measurement signal occurs and said second ring output signal does not occur prior to said third time measurement signal;
   third logic circuit means, responsive to said ring count output signal and to said first, second and third time measurement signals for generating a third identifying signal when said first ring count output signal occurs after said time measurement signal but before said second time measurement signal occurs, and said second ring output signal occurs after said second time measurement signal but before said third time measurement signal occurs;
   identifying means responsive to said first identifying signal for providing an alert that a telephone call is being attempted to said telephone station set;
   first appliance control means for controlling a first appliance in response to said second identifying signal; and
   second appliance control means for controlling a second appliance in response to said third identifying signal.

10. Th apparatus of claim 9 wherein said predetermined number N is selected to be the integer 2.

11. Apparatus for generating two distinct signals depending on the number and timing of the ringing signals of a telephone station set circuit arrangement in which at least one telephone station set is connected to a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the apparatus comprising:
   means responsive to the ringing signal on the line for generating a ring pulse signal for each occurrence of a ringing signal;
   means responsive to the ring pulse signals for counting the number of ring pulse signals and generating a ring count output signal when a number N of ring pulse signals have been received;
   first clock means responsive to the first of the ring pulse signals for generating a first time measurement signal when T3 units of time have passed from the occurrence of the first of the ring pulse signals and for generating a second time measurement signal when T4 units of time have passed fromthe occurrence of the first of the ring pulse signals, said T3 units of time being greater than the sum of T1 and T2 units of time, said T4 units of time being greater than T3 units of time;

first logic circuit means, responsive to said ring count output signal and to said first time measurement signal, for generating a first identifying signal when said ring count output signal occurs before said first time measurement signal occurs;

second logic circuit means, responsive to said ring count output signal and to said second time measurement signal, for generating a second identifying signal when said ring count output signal occurs after said first time measurement signal is generated, but before said second time measurement signal is generated;

identifying means responsive to said first identifying signal for generating a first identification thereby indicating that N rings have occurred before T3 units of time have passed from the start of the first ring;

second clock means responsive to said second identifying signal for generating a first appliance control signal during certain first hours of the day and for generating a second appliance control signal during certain other hours of the day; and first appliance control means responsive to said first appliance control signal for controlling a first appliance, and second appliance control means responsive to said second appliance control signal for controlling a second appliance.

12. A method for generating two identifying signals depending on the number and timing of the ringing signals of a telephone station set circuit arrangement in which at least one telephone station set is connected by a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the method comprising the steps of:

generating a ring pulse signal for each occurrence of a ringing signal on the line;

generating a ring count output signal in response to the ring pulse signals when a number N of ring pulse signals have been received;

generating a first time measurement signal when T3 units of time have passed from the occurrence of the first of the ring pulse signals;

generating a second time measurement signal when T4 units of time have passed from the occurrence of the first of the ring pulse signals, said T3 units of time being greater than the sum of T1 and T2 units of time, said T4 units of time being greater than T3 units of time;

generating a first identifying signal when said ring count output signal occurs before said first time measurement signal occurs;

generating a second identifying signal when said ring count output signal occurs after said first time measurement signal is generated but before said second time measurement signal is generated;

generating a first identification in response to the first identifying signal to indicate that N rings have occurred before T3 units of time have passed from the start of the first ring; and generating a second identification in response to the second identifying signal to indicate that a total of N rings have been counted at a time after T3 units of time but before T4 units of time have passed from the start of the first ring.

13. The method of claim 12 comprising the additional steps of determining the occurance of the condition that more than T4 units of time have occurred from said first ring signal, but less than N ring signals have occurred and in response thereto resetting said ring count output signal.

14. The method of claim 12 comprising the additional steps of determining the occurrence of the condition that the ringing signal on the line has been terminated and in response thereto resetting said ring count output signal and said first and second time measurement signals.

15. The method of claim 12 wherein N is set to be the number two.

16. The method of claim 12 wherein T3 is set to approximately eight seconds, and T4 is set to approximately thirty-two seconds.

17. The method of claim 12 wherein:
said first identifying signal is a first audio tone enable signal;
said second identifying signal is a second audio tone enable signal;
said first identification is a first audio tone; and
said second identification is a second audio tone.

18. A method for generating a telephone call identifying signal and controlling an appliance depending on the number and timing of the ringing signals of a telephone station set circuit arrangement in which at least one telephone station set is connected to a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the method comprising:

generating a ring pulse signal for each occurrence of a ringing signal on the line;

generating a ring count output signal in response to the ring pulse signals when a number N of ring pulse signals have been received;

generating a first time measurement signal when T3 units of time have passed from the occurrence of the first of the ring pulse signals and for generating a second time measurement signal when T4 units of time have passed from the occurrence of the first of the ring pulse signals, said T3 units of time being greater than the sum of T1 and T2 units of time, said T4 units of time being greater than T3 units of time;

generating a first identifying signal when said ring count output signal occurs before said first time measurement signal occurs;

generating a second identifying signal when said ring count output signal occurs after said first time measurement signal is generated, but before said second time measurement signal is generated;

generating a first identification in response to the first identifying signal to indicate that N rings have occurred before T3 units of time have passed from the start of the first ring; and controlling an appliance in response to the second identifying signal.

19. A method of generating a telephone call identifying signal and controlling two appliances depending on the number and timing of the ringing signals of a telephone station set circuit arrangement in which at least one telephone station set is connected to a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the method comprising;

generating a ring pulse signal for each occurrence of a ringing signal;

generating a first ring count output signal when a predetermined number N of ring pulse signals have been received;

generating a second ring count output signal when greater than N ring pulse signals have been received;

generating a first time measurement signal when T3 units of time have passed from the occurrence of the first of the ring pulse signals;

generating a second time measurement signal when T4 units of time have passed from the occurrence of the first of the ring pulse signals;

generating a third time measurement signal when T5 units of time have passed from the occurrence of the first of the ring pulse signals, said T3 units of time being greater than the sum of T1 and T2 units of time, said T4 units of time being greater than T3 units of time, said T5 units of time being greater than T4 units of time;

generating a first identifying signal when said first ring count output signal occurs before said first time measurement signal occurs;

generating a second identifying signal when said first ring count output signal occurs after said first time measurement signal but before said second time measurement signal occurs and said second ring output signal does not occur prior to said third time measurement signal;

generating a third identifying signal when said first ring count output signal occurs after said first time measurement signal but before said second time measurement signal occurs, and said second ring output signal occurs after said second time measurement signal but before said third time measurement signal occurs;

generating an identification in response to said first identifying signal in order to indicate that a telephone call is being attempted to said telephone station set;

controlling a first appliance in response to said second identifying signal; and controlling a second appliance in response to said third identifying signal.

20. The method of claim 19 wherein said predetermined number N is selected to be the integer 2.

21. A method for generating a telephone call alert signal and controlling the operation of appliances as a function of the time during the day depending on the number and timing of the ringing signals of a telephone station set circuit arrangement in which at least one telephone station set is connected to a telephone line to a centralized switching, control and signalling machine, the centralized machine during station set signalling applying a periodic ringing signal sequence to the line, the periodic ringing signal sequence being defined by a ringing signal of a period of T1 units of time followed by an idle period for T2 units of time, the T1 and T2 time unit sum in that order defining the sequence period of said periodic ringing signal, the method comprising:

generating a ring pulse signal in response to the ringing signal on the line for each occurrence of a ringing signal;

generating a ring count output signal when a number N of ring pulse signals have been received;

generating a first time measurement signal when T3 units of time have passed from the occurrence of the first of the ring pulse signals;

generating a second time measurement signal when T4 units of time have passed from the occurrence of the first of the ring pulse signals, said T3 units of time being greater than the sum of T1 and T2 units of time, said T4 units of time being greater than T3 units of time;

generating a first identifying signal when said ring count output signal occurs before said first time measurement signal occurs;

generating a second identifying signal when said ring count output signal occurs after said first time measurement signal is generated, but before said second time measurement signal is generated;

generating a first identification thereby indicating that N rings have occurred before T3 units of time have passed from the start of the first ring;

generating in response to the occurrence of said second identifying signal a first appliance control signal during certain first hours of the day and a second appliance control signal during certain other hours of the day;

controlling a first appliance in response to first appliance control means responsive to said first appliance control signal; and controlling a second appliance in response to second appliance control means responsive to said second appliance control signal.

* * * * *

UNITED STATES PATENT AND TRADEMARK OFFICE
CERTIFICATE OF CORRECTION

PATENT NO. : 4,146,754
DATED : March 27, 1979
INVENTOR(S) : Sam Rose

It is certified that error appears in the above-identified patent and that said Letters Patent are hereby corrected as shown below:

Column 5, line 43, delete "80" and insert --(80)--

Column 6, line 36, delete "OF" and insert --of--

Column 6, line 44, delete "(ff3)" and insert --(FF3)--

Signed and Sealed this

Eleventh Day of September 1979

[SEAL]

Attest:

LUTRELLE F. PARKER

*Attesting Officer*   *Acting Commissioner of Patents and Trademarks*